US012237587B2

(12) United States Patent
Fang et al.

(10) Patent No.: US 12,237,587 B2
(45) Date of Patent: Feb. 25, 2025

(54) PHASED ARRAY ANTENNA

(71) Applicants: Beijing BOE Technology Development Co., Ltd., Beijing (CN); BOE TECHNOLOGY GROUP CO., LTD., Beijing (CN)

(72) Inventors: Jia Fang, Beijing (CN); Feng Qu, Beijing (CN)

(73) Assignees: Beijing BOE Technology Development Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/016,063

(22) PCT Filed: Feb. 23, 2022

(86) PCT No.: PCT/CN2022/077381

§ 371 (c)(1),
(2) Date: Jan. 13, 2023

(87) PCT Pub. No.: WO2023/159367

PCT Pub. Date: Aug. 31, 2023

(65) Prior Publication Data

US 2024/0250421 A1 Jul. 25, 2024

(51) Int. Cl.

| | |
|---|---|
| ***H01Q 3/30*** | (2006.01) |
| ***H01Q 13/06*** | (2006.01) |
| ***H01Q 21/06*** | (2006.01) |

(52) U.S. Cl.

CPC ............... *H01Q 3/30* (2013.01); *H01Q 13/06* (2013.01); *H01Q 21/06* (2013.01); *H01Q 21/064* (2013.01)

(58) Field of Classification Search

CPC ........ H01Q 3/30; H01Q 13/06; H01Q 21/064; H01Q 21/06

See application file for complete search history.

(56) References Cited

U.S. PATENT DOCUMENTS

| | | | | |
|---|---|---|---|---|
| 6,313,793 | B1 * | 11/2001 | Brown | H01P 1/182 343/778 |
| 2005/0035915 | A1 * | 2/2005 | Livingston | H01Q 1/422 343/754 |
| 2007/0200764 | A1 * | 8/2007 | Cho | H01Q 21/065 343/700 MS |

(Continued)

*Primary Examiner* — Hai V Tran

(74) *Attorney, Agent, or Firm* — HOUTTEMAN LAW LLC

(57) ABSTRACT

A phased array antenna includes a phase shifter unit, a waveguide unit and a connection unit, the phase shifter unit has two substrate surfaces and includes at least one phase shifter having two feeding regions; a side where at least one of the substrate surfaces is located is provided with the waveguide unit having a waveguide cavity corresponding to at least one of the feeding regions of each phase shifter; the connection unit corresponds to each waveguide unit and includes an insulation body, the insulation body is fixedly connected with the substrate surface and the waveguide unit on the same side as the insulation body; the insulation body has a first hollow-out portion, the waveguide unit contacts the substrate surface through the first hollow-out portion, a first port of the waveguide cavity is located on a contact surface of the waveguide unit in the first hollow-out portion.

20 Claims, 11 Drawing Sheets

(56) References Cited

U.S. PATENT DOCUMENTS

| | | | | |
|---|---|---|---|---|
| 2009/0278744 | A1* | 11/2009 | Kirino | H01P 1/184 343/700 MS |
| 2019/0140344 | A1* | 5/2019 | Kirino | G01S 7/03 |
| 2020/0194862 | A1* | 6/2020 | Kamo | H01P 5/024 |
| 2022/0397780 | A1* | 12/2022 | Iwahashi | G02F 1/025 |
| 2023/0155266 | A1* | 5/2023 | Fang | H01P 1/181 343/850 |
| 2023/0378642 | A1* | 11/2023 | Raeesi | H01Q 3/36 |

* cited by examiner

PHASED ARRAY ANTENNA

TECHNICAL FIELD

The present disclosure relates to the field of communication technology, and in particular to a phased array antenna.

BACKGROUND

Liquid crystal antennas have a great potential of low cost due to its passiveness characteristic, but it needs to control link loss very finely just because of the passiveness characteristic of the liquid crystal antennas, otherwise it cannot meet the requirement for transmission line loss. Although a waveguide has extremely low loss, it is heavy in weight, and it is highly likely to cause breakage of a glass base of a phase shifter when assembled with the phase shifter. Therefore, an implementatable solution for assembling the waveguide with the phase shifter is needed urgently.

SUMMARY

The present disclosure is directed to solve at least one technical problem in the related art, and provides a phased array antenna which not only can realize alignment and assembly between a waveguide and a phase shifter, but also can avoid damaging a base of the phase shifter during assembly.

In order to achieve the above object, an embodiment of the present disclosure provides a phased array antenna, which includes a phase shifter unit, at least one waveguide unit and at least one connection unit, wherein the phase shifter unit has two substrate surfaces facing away from each other and includes at least one phase shifter, each phase shifter having two feeding regions; a side where at least one of the substrate surfaces is located is provided with the waveguide unit, and the waveguide unit is provided with a waveguide cavity corresponding to at least one of the feeding regions of each phase shifter; the connection unit is arranged corresponding to each waveguide unit and includes an insulation body, and the insulation body is fixedly connected with the substrate surface and the waveguide unit on the same side as the insulation body; the insulation body is provided therein with a first hollow-out portion, the waveguide unit is in contact with the substrate surface through the first hollow-out portion, and a first port of the waveguide cavity is located on a contact surface, which is in contact with the substrate surface, of the waveguide unit in the first hollow-out portion.

In some implementations, the insulation body includes hard foam.

In some implementations, the hard foam includes polyethylene foam, polystyrene foam, ethylene vinyl acetate copolymer or polyurethane foam.

In some implementations, the insulation body is respectively and fixedly attached to the waveguide unit and the substrate surface on the same side as the insulation body by means of bonding.

In some implementations, the at least one waveguide unit includes two waveguide units, which are located on sides where the two substrate surfaces are located, respectively, each waveguide unit has the waveguide cavity provided corresponding to the phase shifter; each waveguide unit is further provided with a reflective cavity corresponding to each phase shifter, and each feeding region of each phase shifter corresponds to the waveguide cavity of one of the waveguide units and corresponds to the reflective cavity of the other of the waveguide units; the insulation body is further provided with a second hollow-out portion therein, the waveguide unit is further in contact with the substrate surface through the second hollow-out portion, and a port of the reflective cavity is located on a contact surface, which is in contact with the substrate surface, of the waveguide unit in the second hollow-out portion.

In some implementations, each of waveguide units includes a waveguide body, which is arranged on a surface of the insulation body away from the substrate surface at the same side as the waveguide body, and a surface of the waveguide body facing the insulation body is formed with a first contact portion and a second contact portion, the first contact portion is inserted in the first hollow-out portion and is in contact with the substrate surface, and the waveguide cavity is formed in the first contact portion; the second contact portion is inserted in the second hollow-out portion and is in contact with the substrate surface, and the reflective cavity is formed in the second contact portion.

In some implementations, the at least one phase shifter includes a plurality of phase shifters, which are arranged in a rectangular array, a row and a column of the rectangular array being in a first direction and a second direction perpendicular to each other in a plane parallel to the substrate surface, respectively, the second direction is perpendicular to a direction in which the two feeding regions of each of the phase shifters are connected; for each waveguide body, first contact portions are the same in number as columns of the rectangular array, and second contact portions are the same in number as the columns of the rectangular array, and all waveguide cavities corresponding to the phase shifters in a same one of the columns are correspondingly formed on a same one of the first contact portions, and all reflective cavities corresponding to the phase shifters in a same one of the columns are correspondingly formed on a same one of the second contact portions; first hollow-out portions are the same in number as the first contact portions, and the first contact portions are arranged in the first hollow-out portions respectively; second hollow-out portions are the same in number as the second contact portions, and the second contact portions are arranged in the second hollow-out portions respectively.

In some implementations, a shape of each first hollowed-out portion is matched with a shape of the first contact portion corresponding to the first hollowed-out portion, and a shape of each second hollow-out portion is matched with a shape of the second contact portion corresponding to the second hollow-out portion.

In some implementations, both the first contact portion and the second contact portion are rectangular protrusions.

In some implementations, the first contact portion includes first contact sub-portions, the first contact sub-portions are the same in number as the waveguide cavities corresponding to the phase shifters in a same one of the columns, and the waveguide cavities are formed in the first contact sub-portions respectively; the second contact portion includes second contact sub-portions, the second contact sub-portions are the same in number as the reflective cavities corresponding to the phase shifters in a same one of the columns, and the reflection cavities are formed in the second contact sub-portions respectively.

In some implementations, the first hollowed-out portion include first hollowed-out sub-portions, the first hollowed-out sub-portions are the same in number as the first contact sub-portions in the first contact portion corresponding to the first hollowed-out portion, and the first contact sub-portions are arranged in the first hollowed-out sub-portions respectively; the second hollow-out portion includes second sub-portions, the second sub-portions is the same in number as the second contact sub-portions in the second contact portions corresponding to the second hollow-out portion, and the second contact sub-portions are arranged in the second hollow-out sub-portions respectively.

In some implementations, for all the waveguide cavities corresponding to the phase shifters in a same one of the columns, any two adjacent waveguide cavities are staggered from each other in the first direction, and all the waveguide cavities are arranged in two sub-columns in the second direction; for all the reflective cavities corresponding to the the phase shifters in a same one of the columns, any two adjacent reflective cavities are staggered in the first direction, and all the reflective cavities are arranged in two sub-columns in the second direction.

In some implementations, each insulation body includes insulation sub-bodies, the insulation sub-bodies are the same in number as the columns of the rectangular array, and each of the insulation sub-bodies is provided with one of the first hollowed-out portions and one of the second hollowed-out portions; each waveguide body includes waveguide sub-bodies, the waveguide sub-bodies are the same in number as the insulation sub-bodies, the waveguide sub-bodies are respectively arranged on surfaces, away from the substrate surface, of the insulation sub-bodies on the same side as the waveguide sub-bodies, and each waveguide sub-body is provided with one of the first contact portions and one of the second contact portions.

In some implementations, each insulation sub-body is provided with a limiting recess, each waveguide sub-body is provided with a limiting protrusion, and the limiting recess is matched with the limiting protrusion; the limiting recess is located between the first hollow-out portion and the second hollow-out portion; the limit protrusion is located between the first contact portion and the second contact portion.

In some implementations, the limiting recess penetrates through the insulation sub-body in a direction perpendicular to the substrate surface.

In some implementations, each of the insulation sub-bodies includes two ring bodies, and ring holes defined by the two ring bodies serve as the first hollowed-out portion and the second hollowed-out portion, respectively.

In some implementations, the limiting protrusion is located between the two ring bodies.

In some implementations, an outline size of an orthographic projection of each of two insulation bodies respectively located at the sides where the two substrate surfaces are located on a plane parallel to the substrate surfaces is greater than an outline size of an orthographic projection of each of the two substrate surfaces on the plane parallel to the substrate surfaces, the two insulation bodies are mutually superposed, and an accommodating space for accommodating the phase shifter unit is formed between the two insulation bodies.

In some implementations, a plurality of fixing holes are provided in each of the two insulation bodies, and the fixing holes are spaced and arranged at a periphery of the phase shifter unit in a circumferential direction of the phase shifter unit; the phased array antenna further includes a plurality of fasteners, the fasteners are the same in number as the fixing holes of each of the insulation bodies, and the fasteners are correspondingly installed in the fixing holes.

DETAIL DESCRIPTION OF EMBODIMENTS

Figure 1:
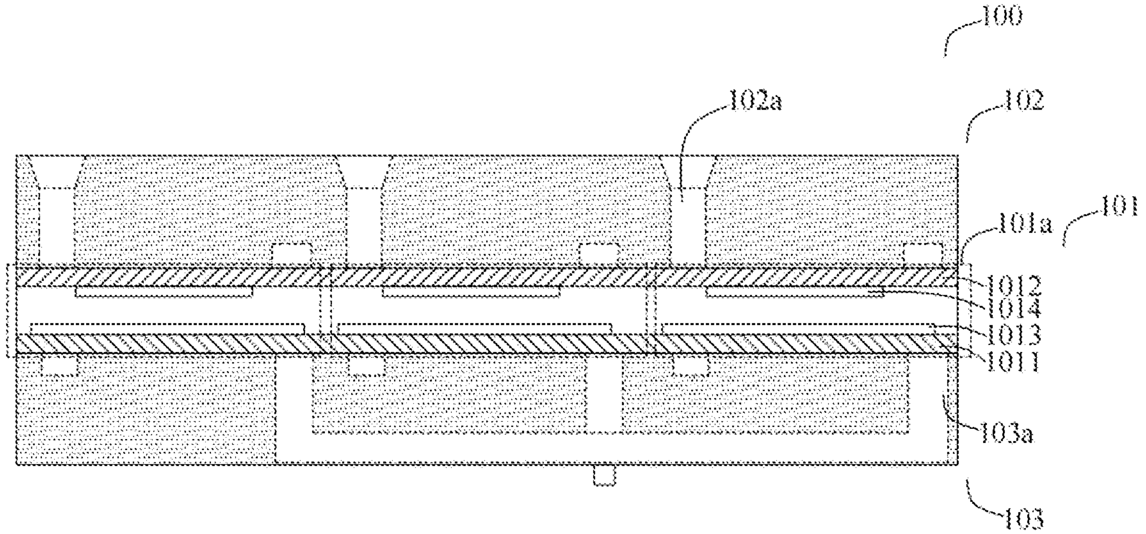
FIG. 1 is a side view of a phased array antenna.

In order to make the objects, technical solutions and advantages of the present disclosure more apparent, the present disclosure will be described below in further detail with reference to the accompanying drawings, obviously, the described embodiments are only part of embodiments of the present disclosure, not all embodiments. All other embodiments, which can be obtained by a person skilled in the art without making any creative effort based on the embodiments in the present disclosure, fall within the protection scope of the present disclosure.

Shapes and sizes of components in the drawings do not reflect true proportion, and are only to facilitate to understand the contents of the embodiments of the present disclosure.

Unless defined otherwise, technical or scientific terms used herein shall have the ordinary meaning as understood by one of ordinary skill in the art to which this disclosure belongs. The terms “first,” “second,” and the like, as used in the description, do not denote any order, quantity, or importance, but rather are used to distinguish one element from another. Also, the use of the terms “a,” “an,”, “the” or the like does not denote a limitation of quantity, but rather denotes the presence of at least one. The word “comprising/including” or “comprises/includes”, and the like, means that the element or item preceding the word includes the element or item listed after the word and its equivalent, but does not exclude other elements or items. The terms “connecting” or “coupling” and the like are not restricted to physical or mechanical connections, but may include electrical connections, whether direct or indirect. The words “upper/on”, “lower/under/below”, “left”, “right”, and the like are used only to indicate relative positional relationships, and when the absolute position of the object being described is changed, the relative positional relationships may be changed accordingly.

The embodiments of the present disclosure are not limited to the embodiments shown in the drawings, but include modifications of configurations formed based on a manufacturing process. Thus, regions shown in the drawings have schematic properties, and shapes of the regions shown in the drawings illustrate specific shapes of regions of elements, but are not intended to be limiting.

FIG. 1 is a side view of a phased array antenna. Referring to FIG. 1, the phased array antenna 100 includes a phase shifter unit 101, a waveguide array 102, and a waveguide feeding network 103, the phase shifter unit 101 includes a first substrate 1011 and a second substrate 1012 disposed opposite to each other, and a dielectric layer (e.g., an adjustable dielectric layer, which is not shown) formed between the first substrate 1011 and the second substrate 1012. Taking the phase shifter unit adopting a coplanar waveguide (CPW) transmission line as an example, the first substrate 1011 includes a first base and a signal line 1013 disposed on a side of the first base close to the dielectric layer, and the signal line 1013 serves as the CPW transmission line. The first substrate 1011 may further include other components such as a reference electrode. The second substrate 1012 includes a second base and a patch electrode 1014 disposed on a side of the second base close to the dielectric layer, the patch electrode 1014 overlaps with the signal line 1013 to form a variable capacitor Cvra(V). In a case where a microwave signal is input to the signal line 1013, since there is a certain voltage difference between voltages applied to the patch electrode 1014 and the signal line 1013, a dielectric constant of the dielectric layer in the variable capacitor Cvra(V) formed by the patch electrode 1014 overlapping the signal line 1013 is changed, and a capacitance value of the variable capacitor Cvra(V) is changed, so that a phase of the microwave signal is changed.

An electric field of the CPW transmission line is a transverse electric field, i.e. a direction of the electric field is parallel to a plane where the substrate is located, and the microwave signal is to be fed in or fed out at any one of two ends of the signal line 1013. In some implementations, microstrip lines may be connected to the two ends of the signal line 1013 through a transmission electrode for feeding, but since the transverse electric field of the signal line 1013 serving as the CPW transmission line cannot be directly converted into a longitudinal electric field of the microstrip line, resulting in that the microwave signal cannot be transmitted directly from the signal line 1013 to the transmission electrode well, and the transmission loss is relatively large. Therefore, feeding structures may be provided at both ends of the signal line 1013 for converting the transverse electric field at each of the two ends of the signal line 1013 into the longitudinal electric field, thereby realizing the conversion from the transverse electric field into the longitudinal electric field at each of the two ends of the coplanar waveguide (CPW) transmission line. In this case, regions where the feeding structures at the two ends of the signal line 1013 are located are two feeding regions of a phase shifter. On this basis, the waveguide array 102 and the waveguide feeding network 103 respectively disposed on two sides of the phase shifter unit 101 (i.e., two sides, away from each other, of the first substrate 1011 and the second substrate 1012) are used to couple the microwave signal in and out through the two feeding regions, for example, the microwave signal may be coupled to the feeding structure in the feeding region corresponding to a waveguide cavity **102*a* in the waveguide array 102 through the waveguide cavity 102*a* in the waveguide array 102, the feeding structure transmits the received microwave signal to the signal line 1013, the microwave signal is propagated along an extending direction in which the signal line 1013 extends, and is transmitted to the feeding structure at the other end of the signal line 1013 after being phase shifted, and the feeding structure couples the microwave signal out through a waveguide cavity 103*a* in the waveguide feeding network 103. The transmission loss of the microwave signal can be effectively reduced by using the waveguide array 102 and waveguide feed network 103** to transmit the signal. Certainly, in practical applications, the phase shifter unit may also adopt any other structure, and the implementations of the present disclosure are applicable to the phase shifter unit that is to be assembled with a waveguide unit.

In some implementations, as shown in FIG. 1, the phase shifter unit 101 includes a plurality of phase shifters **101*a*, and the plurality of phase shifters 101*a* are arranged in an array in a plane parallel to the first substrate 1011, and each phase shifter 101*a* is provided with one signal line 1013, that is, each phase shifter 101*a* has two feeding regions corresponding to two ends of the signal line 1013. In an implementation, the number of waveguide cavities 102*a* in the waveguide array 102 is the same as that of the phase shifters 101*a*, and each waveguide cavity 102*a* is correspondingly disposed in one of the feeding regions of each phase shifter 101*a*; the number of waveguide cavities 103*a* in the waveguide feeding network 103 is the same as that of the phase shifters 101*a*, and each waveguide cavity 103*a* is correspondingly disposed in the other one of the feeding regions of each phase shifter 101*a*, so that the microwave signal can be coupled in and out through the two feeding regions of each phase shifter 101*a***.

However, the waveguide array 102 and the waveguide feeding network 103 in FIG. 1 are directly assembled on surfaces of the first substrate 1011 and the second substrate 1012 of the phase shifter unit 101 away from the dielectric layer, respectively, because weights of the waveguide array 102 and the waveguide feeding network 103 are relatively large, and the first substrate 1011 and the second substrate 1012 usually adopt fragile glass bases, the glass bases are easily damaged during assembly. Moreover, since the glass bases and the waveguide unit cannot be well attached together, during the waveguide unit being assembled onto the glass bases, slight inclination of the waveguide unit will easily cause dislocation between the glass bases and the waveguide unit, and thus the difficulty of assembly is relatively great.

In order to solve the above problem, an embodiment of the present disclosure provides a phased array antenna, which may be a transmitting antenna or a receiving antenna. The phased array antenna includes a phase shifter unit, a waveguide unit and a connection unit, the phase shifter unit has two substrate surfaces which are opposite to each other, and includes at least one phase shifter, and each phase shifter has two feeding regions. Taking the phase shifter unit 101 shown in FIG. 1 as an example, the phase shifter unit 101 includes two substrate surfaces, i.e., the surfaces of the first substrate 1011 and the second substrate 1012 away from the dielectric layer, and the phase shifter unit 101 includes a plurality of phase shifters 101*a*, all of the phase shifters 101*a* share the base of the first substrate 1011 and the base of the second substrate 1012, which are glass bases, for example, and the substrate surfaces are the surfaces of the bases away from the dielectric layer. The regions where the feeding structures at the two ends of the signal line 1013 of each phase shifter 101*a* are located are two feeding regions of the phase shifter.

Figure 2:
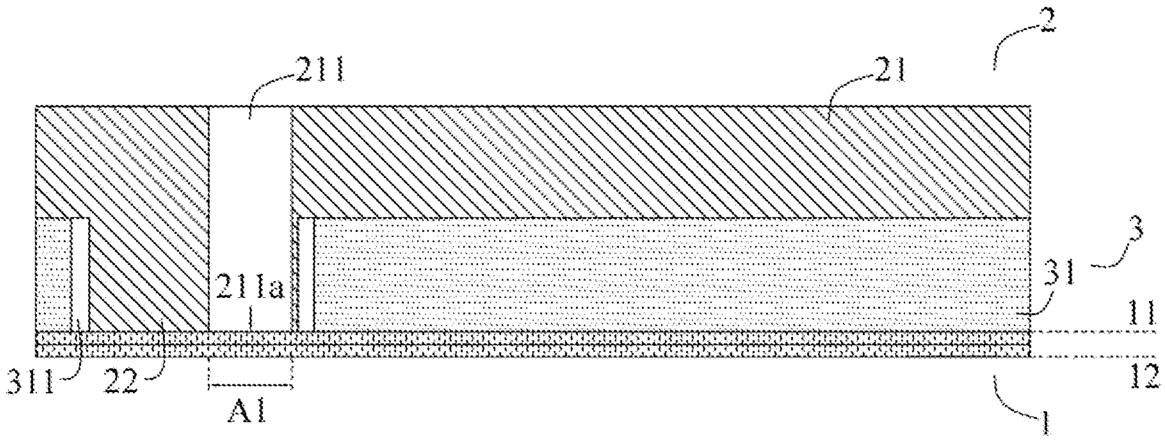
FIG. 2 is a partial side view illustrating a first implementation of a phase shifter in a phased array antenna according to an embodiment of the present disclosure.

FIG. 2 is a partial side view illustrating a first implementation of a phase shifter in a phased array antenna according to an embodiment of the present disclosure. Referring to FIG. 2, the phase shifter unit has two substrate surfaces, i.e., a first substrate surface 11 and a second substrate surface 12, facing away from each other, and includes at least one phase shifter 1, each phase shifter 1 has two feeding regions, i.e., a first feeding region A1 and a second feeding region (not shown in FIG. 2). FIG. 2 does not show structures of the phase shifter 1 between the bases.

Specifically, a waveguide unit 2 is provided on a side where the first substrate surface 11 is located, the waveguide unit 2 has a waveguide cavity 211 provided corresponding to the first feeding region A1 of each phase shifter 1. The waveguide unit 2 may have various structures, for example, the waveguide unit 2 in FIG. 2 includes a plate-shaped waveguide body 21. Certainly, in practical applications, the waveguide body 21 may be of any other shaped structure, for example, a column-shaped structure, such as a cylinder structure or a rectangular cylinder structure. A cross-sectional shape of the waveguide cavity 211 may be rectangular, circular, etc., and the embodiments of the present disclosure are not particularly limited thereto. In addition, the second feeding region without any waveguide cavity correspondingly provided may adopt other structures such as the microstrip line to realize feeding in and feeding out of the microwave signal.

In some implementations, the waveguide body 21 may be made of metal with a relatively light weight, such as aluminum, which contributes to reduce an overall weight of the waveguide unit 2, and the waveguide body 21 may be manufactured by using a computer numerical control (CNC) precision machining process, or may be manufactured by using injection molding, plating, or the like.

The connection unit 3 includes an insulation body 31, in some implementations, the insulation body 31 is in a plate shape, and two surfaces of the insulation body 31 facing away from each other are attached to the first substrate surface 11 and a surface of the waveguide body 21 facing the insulation body 31, respectively. The insulation body 31 is fixedly connected to the first substrate surface 11 and the waveguide body 21, respectively, and by fixedly connecting the insulation body 31 to the first substrate surface 11 and the waveguide body 21, respectively, damage to the substrates of the phase shifter unit during assembly can be avoided. The fixedly connecting may be realized in various modes, for example, by bonding, and an adhesive layer may be coated on each of two surfaces of the insulation body 31 respectively facing the first substrate surface 11 and the waveguide main body 21, so as to bond and fix the insulation body 31 to the first substrate surface 11 and the waveguide main body 21, thereby preventing sliding and dislocating between the first substrate surface 11 and the waveguide main body 21 from occurring. Certainly, in practical applications, other modes, such as clamping, plugging, screwing and the like, may be adopted for the fixedly connecting.

In some implementations, the insulation body 31 includes hard foam, the hard foam has a relatively high density so as to ensure to have sufficient hardness to be fixed between the waveguide body 21 and the first substrate surface 11, and the hard foam does not damage the substrates of the phase shifter unit during assembly. The hard foam may include, for example, Expand aple poly ethylene (EPE) foam, Expanded Polystyrene (EPS) foam, ethylene-vinyl acetate (EVA) copolymer, polyurethane foam, or the like. In practical applications, the insulation body 31 may be made of other materials, with a relatively hight density, that can be manufactured by a machining process such as numerical control precision machining, and parameters such as shape, density, and thickness of the insulation body 31 may be set according to the shape, material, weight, contact area, and the like of the waveguide unit 2, which is not particularly limited in the embodiments of the present disclosure.

As shown in FIG. 2, the insulation body 31 is provided with a first hollow-out portion 311 therein, the waveguide unit 2 is in contact with the first substrate surface 11 through the first hollow-out portion 311, and in some implementations, a first contact portion 22 capable of penetrating through the first hollow-out portion 311 to contact the first substrate surface 11 is formed in the waveguide body 21, and the waveguide cavity 211 is correspondingly formed in the first contact portion 22. A first port 211*a* of the waveguide cavity 211 is located on a contact surface, which is in contact with the first substrate surface 11, of the waveguide unit 2 in the first hollow-out portion 311, that is, the contact surface is an end surface of the first contact portion 22 away from the waveguide body 21. The first port 211*a* faces the first feeding region A1 so that the microwave signal may be coupled in and out from the first feed region A1. A second port (not shown) of the waveguide cavity 211 is configured to connect a signal source or a load, or communicates with other waveguide cavities 211 to form a waveguide feeding network (e.g., the waveguide feeding network 103 in FIG. 1).

In practical applications, if the waveguide unit 2 is in a column shape, it may be, for example, inserted into the first hollow-out portion 311, and the waveguide unit 2 in the column shape may be fixed to the insulation body 31 in various ways, for example, a flange stacked on the insulation body 31 is disposed on a peripheral surface of the waveguide unit 2, and the flange and the insulation body 31 are fixed together by using an adhesive, a fastener, or the like. In addition, the waveguide cavity 211 is manufactured in the same process as the waveguide body 21, and a length of the waveguide cavity 211 depends on selected material and parameters, such as thickness and deformation, of the insulation body 31.

In the implementation of the present disclosure, the first hollow-out portion 311 is provided in the insulation body 31, and the waveguide unit 2 is in contact with the first substrate surface 11 through the first hollow-out portion 311, so that the first hollow-out portion 311 can be used for limiting the waveguide unit 2, and assisting the waveguide unit 2 to be aligned with the phase shifter unit, avoiding the waveguide unit 2 from being inclined during assembly, and therefore, the waveguide unit 2 and the phase shifter unit can be prevented from being dislocated, and further, the difficulty in assembling is reduced.

It should be noted that the waveguide body 21 in FIG. 2 may correspond to only one phase shifter 1, or may correspond to a plurality of phase shifters 1, and in the latter case, FIG. 2 only shows that a part or a division of the waveguide body 21 corresponds to one phase shifter 1. In addition, there may be one or more first contact portions 22 in each waveguide body 21, and one or more waveguide cavities 211 may be formed in each first contact portion 22.

Figure 3:
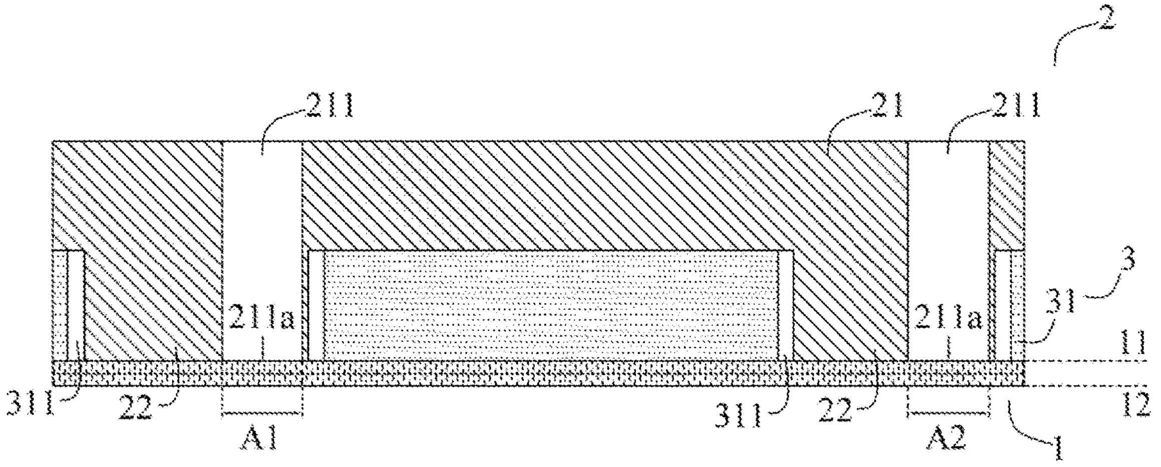
FIG. 3 is a partial side view illustrating a second implementation of a phase shifter in a phased array antenna according to an embodiment of the present disclosure.

FIG. 3 is a partial side view illustrating a second implementation of a phase shifter in a phased array antenna according to an embodiment of the present disclosure. Referring to FIG. 3, in some implementations, the waveguide unit 2 has two waveguide cavities 211 respectively corresponding to the first feeding region A1 and the second feeding region A2 of each phase shifter 1, and the two waveguide cavities 211 are located on a same side of the phase shifter 1. Correspondingly, two first hollow-out portions 311 are disposed in the insulation body 31, two first contact portions 22 are correspondingly formed on the waveguide body 21, and the two first contact portions 22 penetrate through the two first hollow-out portions 311 respectively and contact the first substrate surface 11, and the two waveguide cavities 211 are correspondingly formed in the two first contact portions 22. Certainly, in practical applications, the waveguide unit 2 may also be provided with only one waveguide cavity 211 corresponding to the second feeding region A2. That is, the waveguide unit 2 may have a waveguide cavity provided corresponding to at least one of the feeding region of each phase shifter 1.

Figure 4:
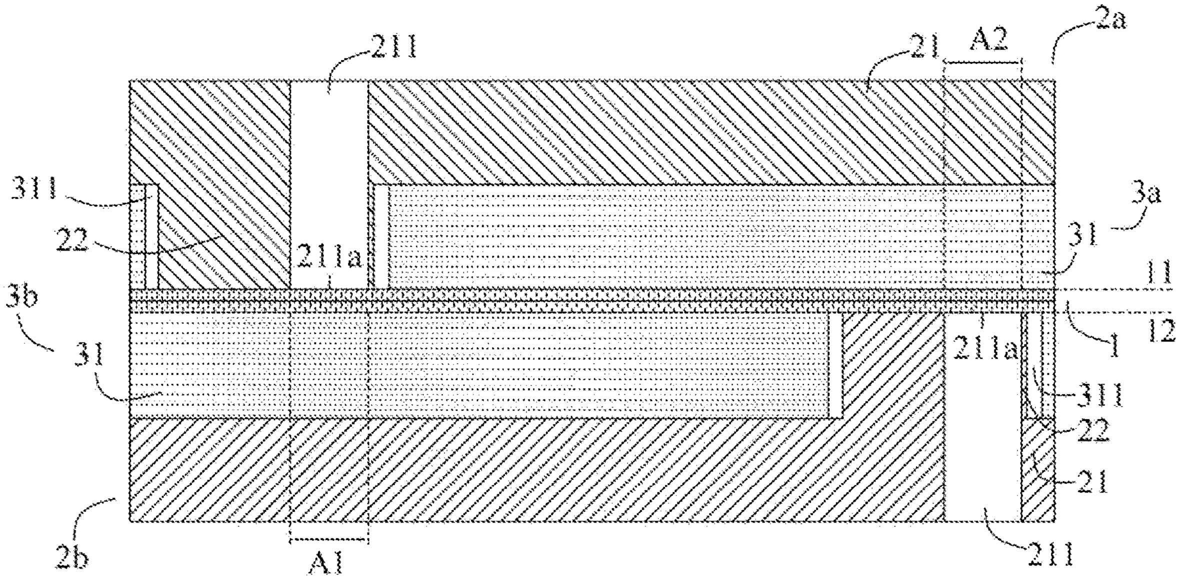
FIG. 4 is a partial side view illustrating a third implementation of a phase shifter in a phased array antenna according to an embodiment of the present disclosure.

FIG. 4 is a partial side view illustrating a third implementation of a phase shifter in a phased array antenna according to an embodiment of the present disclosure. Referring to FIG. 4, in some implementations, two waveguide units (2*a*, 2*b*) are respectively disposed on sides where the first substrate surface 11 and the second substrate surface 12 are located, the two waveguide units (2*a*, 2*b*) each have two waveguide cavities 211 corresponding to the first feeding region A1 and the second feeding region A2 of each phase shifter 1, and the two waveguide cavities 211 are located on different sides of the phase shifter 1, which can also feed the microwave signal into and out from the first feeding region A1 and the second feeding region A2. In practical applications, the waveguide unit may be disposed on the side where at least one substrate surface is located, and the waveguide unit has the waveguide cavity 211 disposed corresponding to at least one of the feeding regions of each phase shifter 1. Furthermore, a connection unit is provided corresponding to each waveguide unit, as shown in FIG. 4, two connection units (3*a*, 3*b*) are respectively provided on the sides where the first substrate surface 11 and the second substrate surface 12 are located, each connection unit includes the insulation body 31, and each insulation body 31 is fixedly connected to the substrate surface and the waveguide unit 2 on the same side as the insulation body 31.

Other structures and functions of the phased array antenna shown in FIGS. 3 and 4 are the same as those of the phased array antenna shown in FIG. 2, and a detailed description thereof is omitted here since it has been given in the foregoing.

In some implementations, corresponding to each phase shifter 1, the waveguide unit may further have a reflective cavity disposed corresponding to the waveguide cavity, and the reflective cavity is located at a side opposite to the waveguide cavity corresponding to the reflective cavity, for example, if the waveguide cavity is located at the side where the first substrate surface 11 is located, the reflective cavity is located at the side where the second substrate surface 12 is located, that is, the waveguide cavity and the reflective cavity, which are opposite to each other, are respectively formed in two waveguide units respectively located at the sides where the first substrate surface 11 and the second substrate surface 12 are located. Since the electric field of the feed structure of the phase shifter 1 is a longitudinal electric field, microwave signals may be radiated from both sides of the feed structure in the longitudinal direction, the microwave signal of the feed structure radiated toward the waveguide cavity is coupled into the waveguide cavity, and the microwave signal of the feed structure radiated away from the reflective cavity is reflected back to the waveguide cavity, opposite to the reflective cavity, by the reflective cavity, thereby effectively increasing the radiation efficiency. In practical applications, the number of the reflective cavities may also be less than that of the waveguide cavities, that is, there may be waveguide cavities not corresponding to any reflective cavity.

Figure 5:
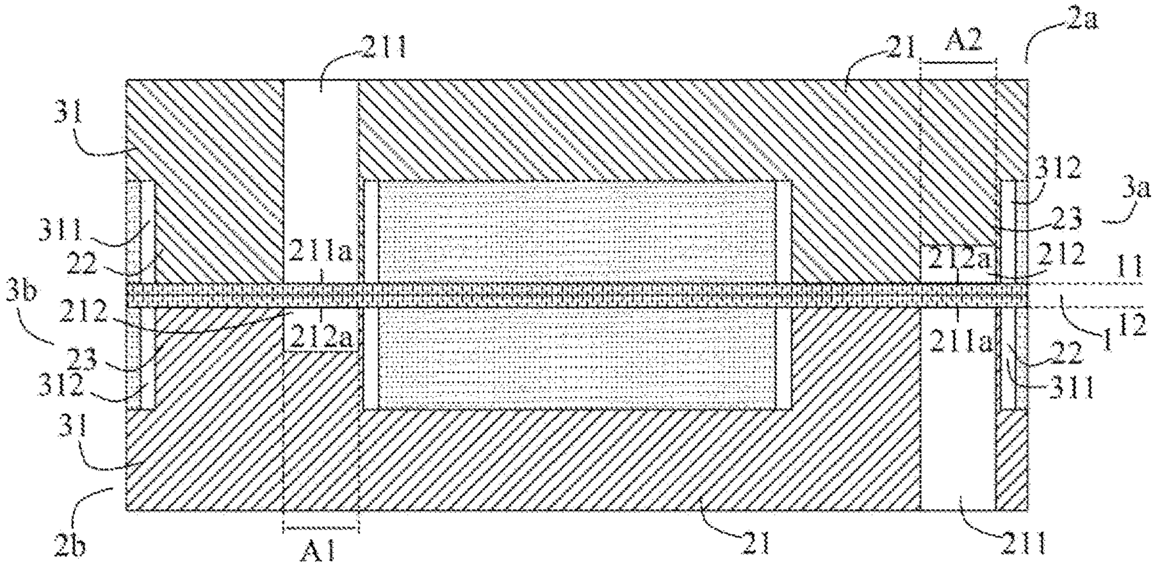
FIG. 5 is a partial side view illustrating a fourth implementation of a phase shifter in a phased array antenna according to an embodiment of the present disclosure.

Specifically, FIG. 5 is a partial side view illustrating a fourth implementation of a phase shifter in a phased array antenna according to an embodiment of the present disclosure. Referring to FIG. 5, there are two waveguide units, namely a first waveguide unit 2*a* and a second waveguide unit 2*b*, which are respectively located at the side where the first substrate surface 11 is located and the side where the second substrate surface 12 is located, and each waveguide unit has a waveguide cavity 211 corresponding to each phase shifter 1. On this basis, each waveguide unit further has a reflective cavity 212 provided corresponding to each phase shifter 1, each feeding region of each phase shifter 1 corresponds to the waveguide cavity 211 of one of the waveguide units and corresponds to the reflective cavity 212 of the other one of the waveguide units, for example, as shown in FIG. 5, the waveguide cavity 211 and the reflective cavity 212 of the first waveguide unit 2*a* correspond to the first feeding region A1 and the second feeding region A2, respectively; the waveguide cavity 211 and the reflective cavity 212 of the second waveguide unit 2*b* correspond to the second feeding region A2 and the first feeding region A1, respectively. Certainly, in practical applications, it is also possible to make one of the first waveguide unit 2*a* and the second waveguide unit 2*b* have two waveguide cavities 211 and the other one of the first waveguide unit 2*a* and the second waveguide unit 2*b* have two reflective cavities 212, that is, the two waveguide cavities 211 are located at one side of the phase shifter 1 and the two reflective cavities 212 are located at the other side of the phase shifter 1. Furthermore, as shown in FIG. 5, the insulation body 31 of each of two connection units (3*a*, 3*b*) is further provided with a second hollow-out portion 312 therein, each waveguide unit is further in contact with the substrate surface through the second hollow-out portion 312, and the port 212*a* of the reflective cavity 212 is located on a contact surface, which is in contact with the substrate surface, of the waveguide unit in the second hollow-out portion 312.

In some implementations, as shown in FIG. 5, each waveguide unit includes a waveguide body 21, the waveguide body 21 is located on a surface of the insulation body 31, which is on the same side as the waveguide body 21, away from the substrate surface, and a surface of the waveguide body 21 facing the insulation body 31 is formed with a first contact portion 22 and a second contact portion 23, the first contact portion 22 is inserted into the first hollow-out portion 311 and contacts the substrate surface; the waveguide cavity 211 is formed in the first contact portion 22; the second contact portion 23 is inserted into the second hollow-out portion 312 and contacts the substrate surface; the reflective cavity 212 is formed in the second contact portion 23. Shapes and sizes of the first contact portion 22 and the second contact portion 23 may be set as desired, and shapes and sizes of the first hollow-out portion 311 and the second hollow-out portion 312 may be set according to the shapes and sizes of the first contact portion 22 and the second contact portion 23, as long as the first hollow-out portion 311 and the second hollow-out portion 312 can accommodate the first contact portion 22 and the second contact portion 23, respectively, which is not particularly limited in the embodiments of the present disclosure.

Figure 6:
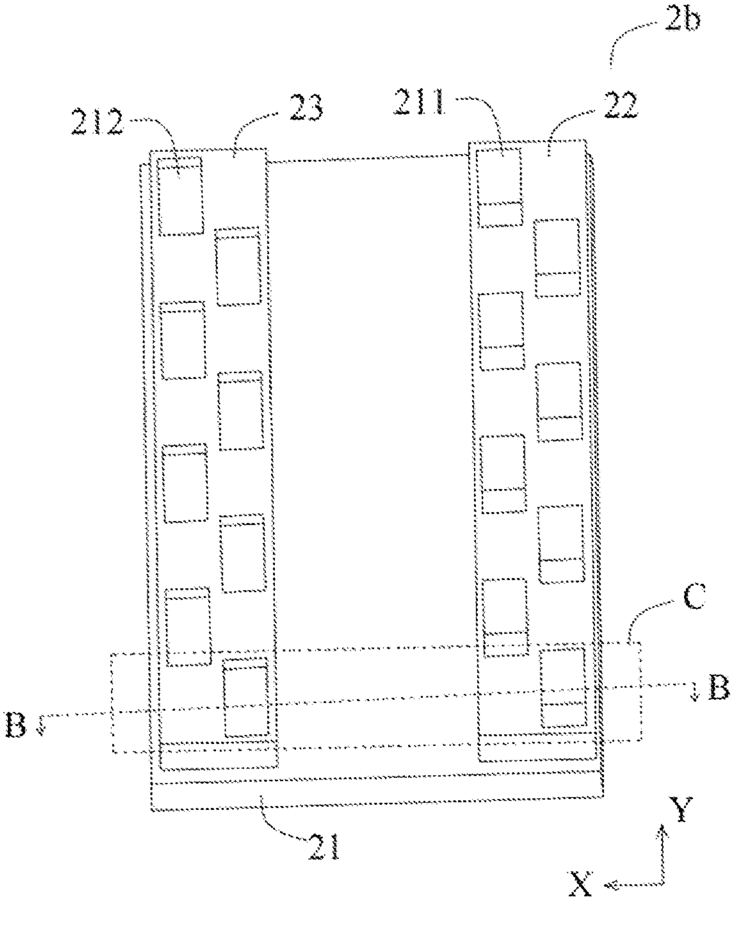
FIG. 6 is a structural diagram illustrating a first implementation of a waveguide unit corresponding to one column of a phase shifter array in a phased array antenna according to an embodiment of the present disclosure.
Figure 7:
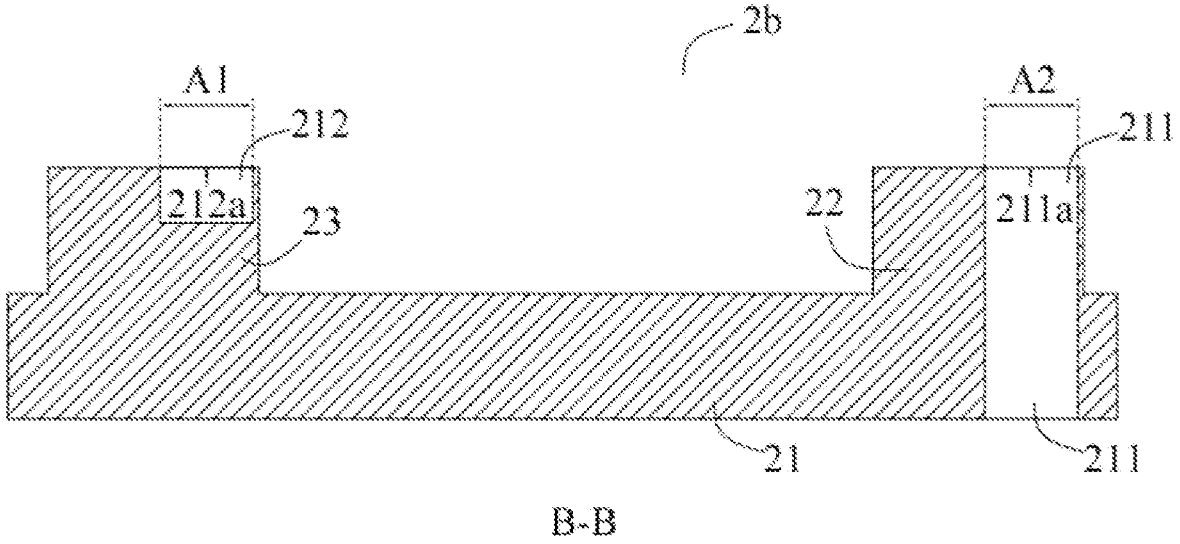
FIG. 7 is a cross-sectional view of a waveguide unit taken along line B-B of FIG. 6.

In some implementations, there may be a plurality of phase shifters 1 and they are arranged in a rectangular array, rows and columns of the rectangular array are in a first direction and a second direction perpendicular to each other in a plane parallel to the substrate surface, respectively, the second direction is perpendicular to a direction (for example, an extending direction in which the signal line 1013 in FIG. 1 extends) of a connection line that connects the two feeding regions of each phase shifter 1. FIG. 6 is a structural diagram illustrating a first implementation of a waveguide unit corresponding to one column of a phase shifter array in a phased array antenna according to an embodiment of the present disclosure. FIG. 7 is a cross-sectional view of the waveguide unit taken along line B-B of FIG. 6. As shown in FIG. 6, the first direction is a X direction and the second direction is a Y direction.

Taking the second waveguide unit **2*b* as an example, each of the number of the first contact portions 22 and the number of the second contact portions 23 in the waveguide main body 21 is the same as the number of the columns of the rectangular array, and FIGS. 6 and 7 only show a part or a division of the waveguide body 21 corresponding to one of the columns of the rectangular array, that is, the waveguide body 21 may be an unitary structure corresponding to all the phase shifters 1; alternatively, the waveguide body 21** may be composed of a plurality of waveguide sub-bodies, and the number of the waveguide sub-bodies is the same as the number of the columns of the rectangular array, and each waveguide sub-body corresponds to one of the columns of the rectangular array.

All the waveguide cavities 211 corresponding to a same column of phase shifters 1 are correspondingly formed on a same first contact portion 22, and all the reflective cavities 212 corresponding to a same column of phase shifters 1 are correspondingly formed on a same second contact portion 23. In this case, as shown in FIG. 6, taking a case where the waveguide body 21 is composed of a plurality of waveguide sub-bodies as an example, for each waveguide sub-body, one first contact portion 22 and one second contact portion 23 are provided thereon, the first contact portion 22 is formed thereon with all the waveguide cavities 211 corresponding to the same column of phase shifters; the second contact portion 23 is formed thereon with all the reflective cavities 212 corresponding to the same column of phase shifters. The first waveguide unit **2*a* and the second waveguide unit 2*b* are the same in structure, but are located on different sides of the phase shifter 1. It will be readily appreciated that if the waveguide body 21 is of a unitary structure and corresponds to all the phase shifters 1, only a part of the waveguide body 21 corresponding to one column of phase shifters in the rectangular array is shown in FIG. 6**.

Figure 8:
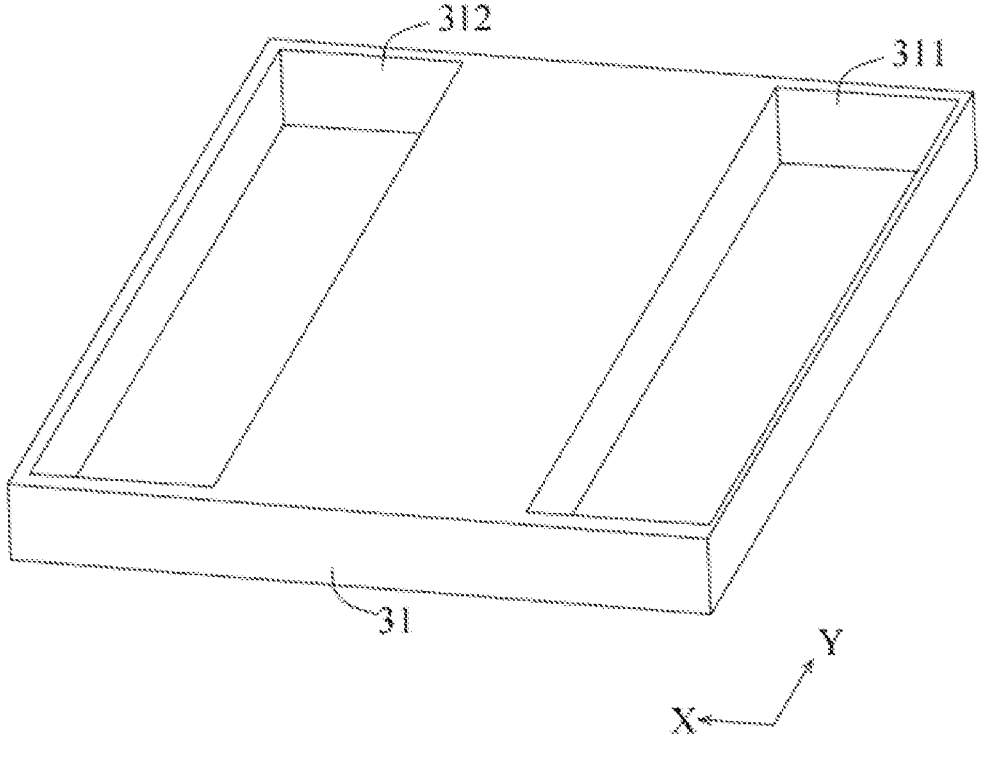
FIG. 8 is a structural diagram illustrating a first implementation of an insulation body corresponding to one column of a phase shifter array in a phased array antenna according to an embodiment of the present disclosure.

The number of the first hollow-out portions 311 is the same as that of the first contact portions 22, and the first contact portions 22 are correspondingly arranged in the first hollow-out portions 311 respectively; the number of the second hollow-out portions 312 is the same as that of the second contact portions 23, and the second contact portion 23 are correspondingly arranged in the second hollow-out portions 312 respectively. For example, corresponding to the waveguide unit shown in FIG. 6, FIG. 8 is a structural diagram illustrating a first implementation of an insulation body corresponding to one column of a phase shifter array in a phased array antenna according to an embodiment of the present disclosure. FIG. 8 shows only a part or division of the insulation body 31 corresponding to one of the columns of the rectangular array, that is, the insulation body 31 may be an unitary structure corresponding to all of the phase shifters 1; alternatively, the insulation body 31 may be composed of a plurality of insulation sub-bodies, and the number of the insulation sub-bodies is the same as the number of the columns of the rectangular array, and each insulation sub-body corresponds to one of the columns of the rectangular array. As shown in FIG. 8, for each insulation sub-body, one first hollow-out portion 311 and one second hollow-out portion 312 are provided thereon, the first contact portion 22 in FIG. 6 is disposed in the first hollow-out portion 311, and the second contact portion 23 in FIG. 6 is disposed in the second hollow-out portion 312. It will be readily appreciated that if the insulation body 31 is of an unitary structure and corresponds to all of the phase shifters 1, only the part of the insulation body 31 corresponding to one of the columns of the rectangular array is shown in FIG. 8.

In some implementations, a shape of each first hollow-out portion 311 is matched with the shape of the first contact portion 22 corresponding to the first hollow-out portion 311; a shape of each second hollow-out portion 312 is matched with the shape of the second contact portion 23 corresponding to the second hollow-out portion 312. Therefore, the limiting function can be better realized, and the accuracy of alignment between the waveguide unit 2 and the phase shifter unit is improved. In some implementations, the first contact portion 22 and the second contact portion 23 are both rectangular protrusions, correspondingly, the first hollow-out portion 311 and the second hollow-out portion 312 are both rectangular through holes.

Figure 9:
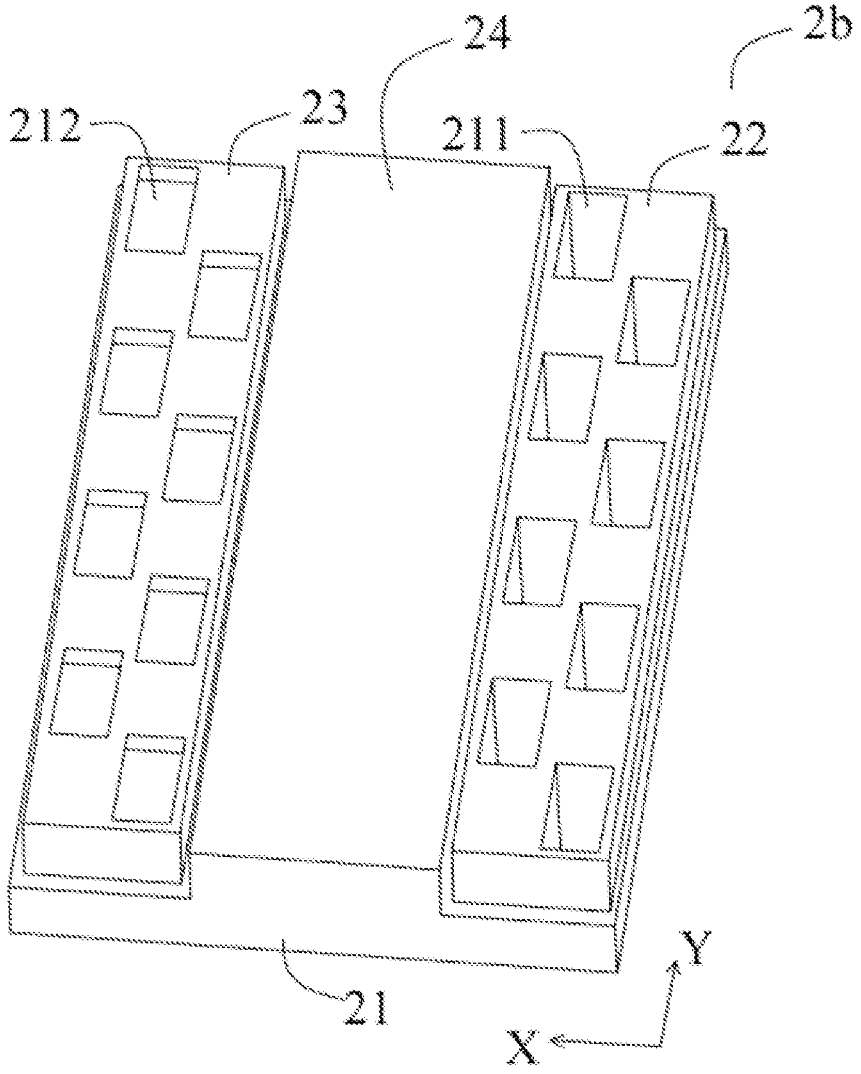
FIG. 9 is a structural diagram illustrating a second implementation of a waveguide unit corresponding to one column of a phase shifter array in a phased array antenna according to an embodiment of the present disclosure.
Figure 10:
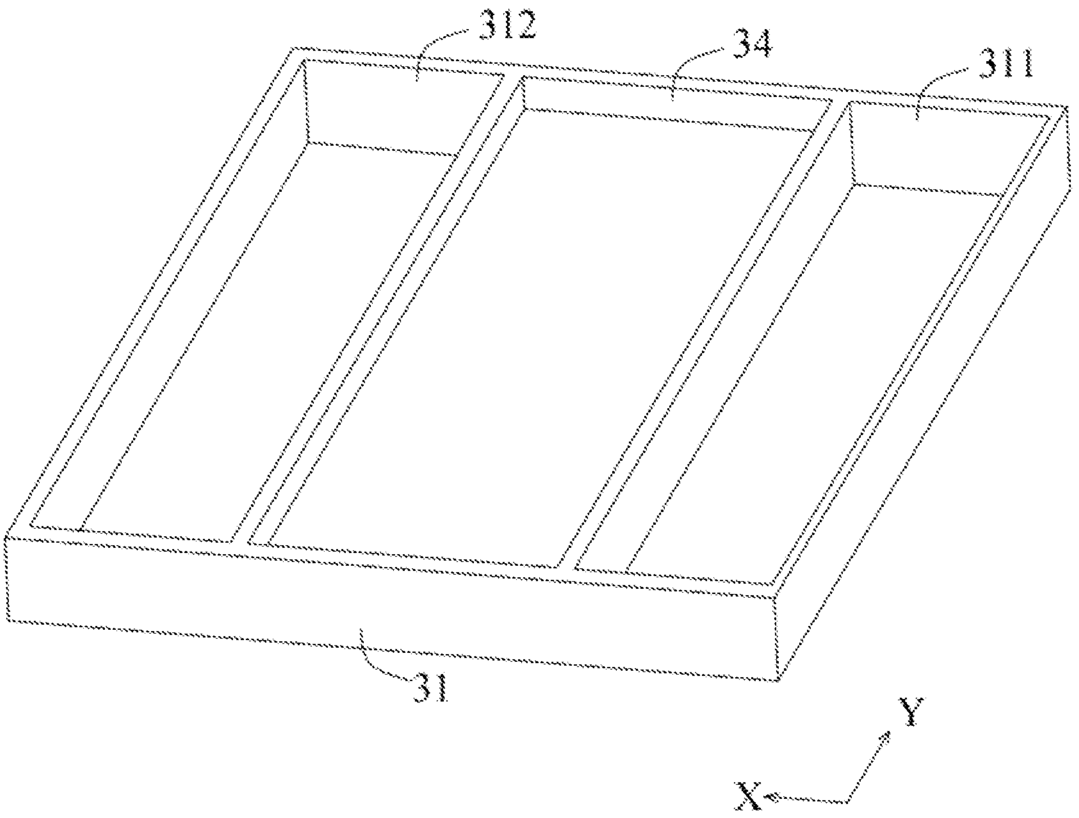
FIG. 10 is a structural diagram illustrating a second implementation of an insulation body corresponding to one column of a phase shifter array in a phased array antenna according to an embodiment of the present disclosure.

FIG. 9 is a structural diagram illustrating a second implementation of a waveguide unit corresponding to one column of a phase shifter array in a phased array antenna according to an embodiment of the present disclosure. FIG. 10 is a structural diagram illustrating a second implementation of an insulation body corresponding to one column of a phase shifter array in a phased array antenna according to an embodiment of the present disclosure. As shown in FIGS. 9 and 10, in some implementations, in order to better realize the limiting function and reduce the difficulty of assembly, the waveguide body 21 is provided with a limiting protrusion 24, and correspondingly, the insulation body 31 is provided with a limiting recess 34, and the limiting recess 34 is matched with the limiting protrusion 24. Alternatively, taking a case where the waveguide body 21 is composed of a plurality of waveguide sub-bodies and the insulation body 31 is composed of a plurality of insulation sub-bodies as an example, each waveguide sub-body is provided with a limiting protrusion 24 thereon, and the limiting protrusion 24 is located between the first contact portion 22 and the second contact portion 23; each insulation sub-body is provided with a limiting access 34 thereon, and the limiting access 34 is located between the first hollow-out portion 311 and the second hollow-out portion 312. Certainly, such arrangement of the limiting recess 34 and the limiting protrusion 24 is also applicable to the case where each of the waveguide body 21 and the insulation body 31 is of a unitary structure.

In some implementations, each of the limiting protrusion 24 and the limiting recess 34 is rectangular, but the embodiments of the present disclosure are not limited thereto, and in practical applications, the limiting recess and the limiting protrusion may also be in any other shapes.

Figure 11:
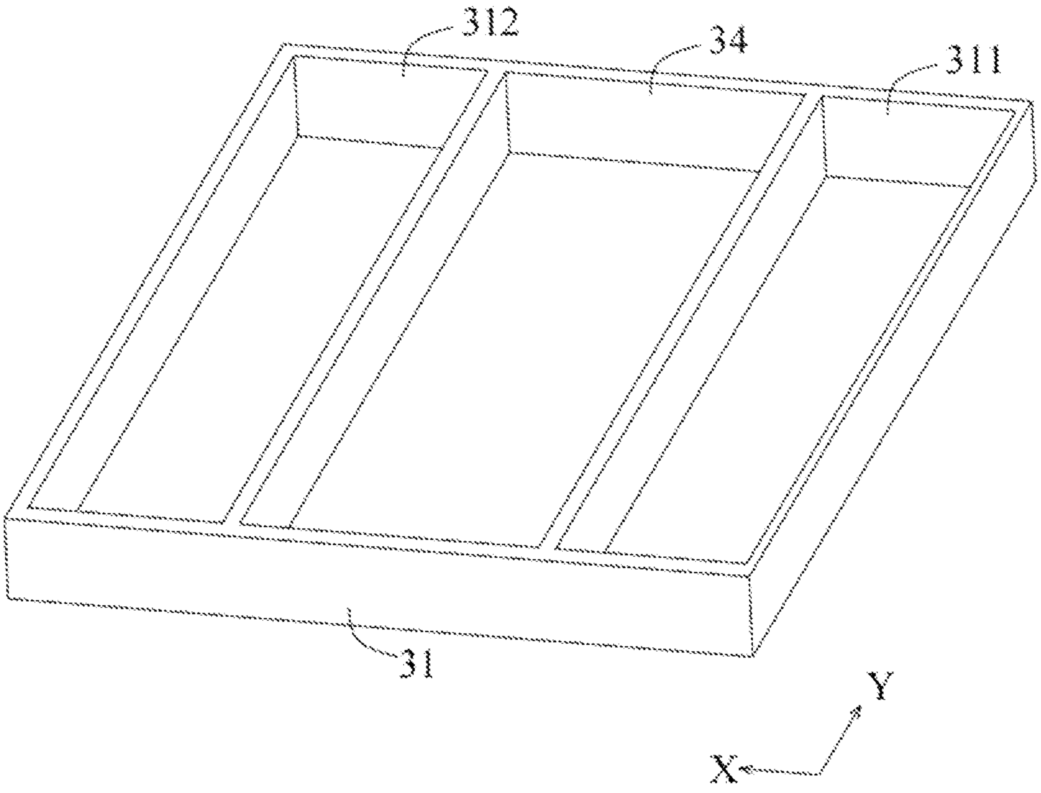
FIG. 11 is a structural diagram illustrating a third implementation of an insulation body corresponding to one column of a phase shifter array in a phased array antenna according to an embodiment of the present disclosure.

FIG. 10 shows that a depth of the limiting recess 34 is less than a thickness of the insulation body 31, that is, the limiting recess 34 is a blind slot, however, the embodiments of the present disclosure are not limited thereto. FIG. 11 is a structural diagram illustrating a third implementation of an insulation body corresponding to one column of a phase shifter array in a phased array antenna according to an embodiment of the present disclosure. As shown in FIG. 11, in some implementations, the limiting recess 34 penetrates through the insulation body 31 in a direction perpendicular to the substrate surface (i.e., perpendicular to a plane where the X direction and the Y direction are located), i.e., the depth of the limiting recess 34 is equal to the thickness of the insulation body 31, in such case, a thickness of the limiting protrusion 24 may be equal to the thickness of the insulation body 31, so that the limiting protrusion 24 can contact the substrate surface, and the connection stability between the waveguide unit and the phase shifter unit can be further improved. Certainly, the thickness of the limiting protrusion 24 may be less than that of the insulation body 31.

Figure 12:
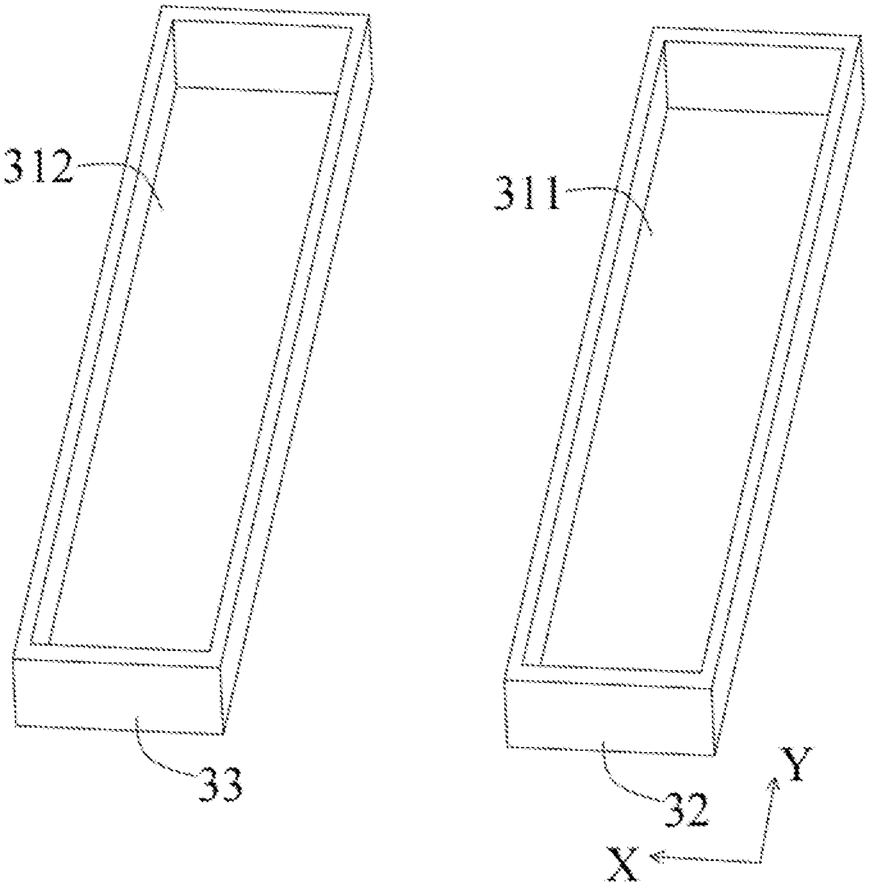
FIG. 12 is a structural diagram illustrating a fourth implementation of an insulation body corresponding to one column of a phase shifter array in a phased array antenna according to an embodiment of the present disclosure.

In the case where the insulation body 31 is composed of a plurality of insulation sub-bodies, each insulation sub-body may further adopt a split structure, for example, FIG. 12 is a structural diagram illustrating a fourth implementation of an insulation body corresponding to one column of a phase shifter array in a phased array antenna according to an embodiment of the present disclosure. As shown in FIG. 12, each insulation sub-body includes two ring bodies (32, 33), and ring holes defined by the two ring bodies (32, 33) serve as the first hollow-out portion 311 and the second hollow-out portion 312, respectively. In other words, the two ring bodies (32, 33) are respectively sleeved on the first contact portion 22 and the second contact portion 23 corresponding thereto, which can also realize the fixed connection between the substrate surface and the waveguide body 21, and can avoid the damage to the substrates of the phase shifter unit during the assembly. In such case, In some implementations, in order to better realize the limiting function and reduce the difficulty of assembly, as shown in FIG. 9, the limiting protrusion 24 is provided on the waveguide body 21, and the limiting protrusion 24 is located between the two ring bodies (32, 33).

Figure 13:
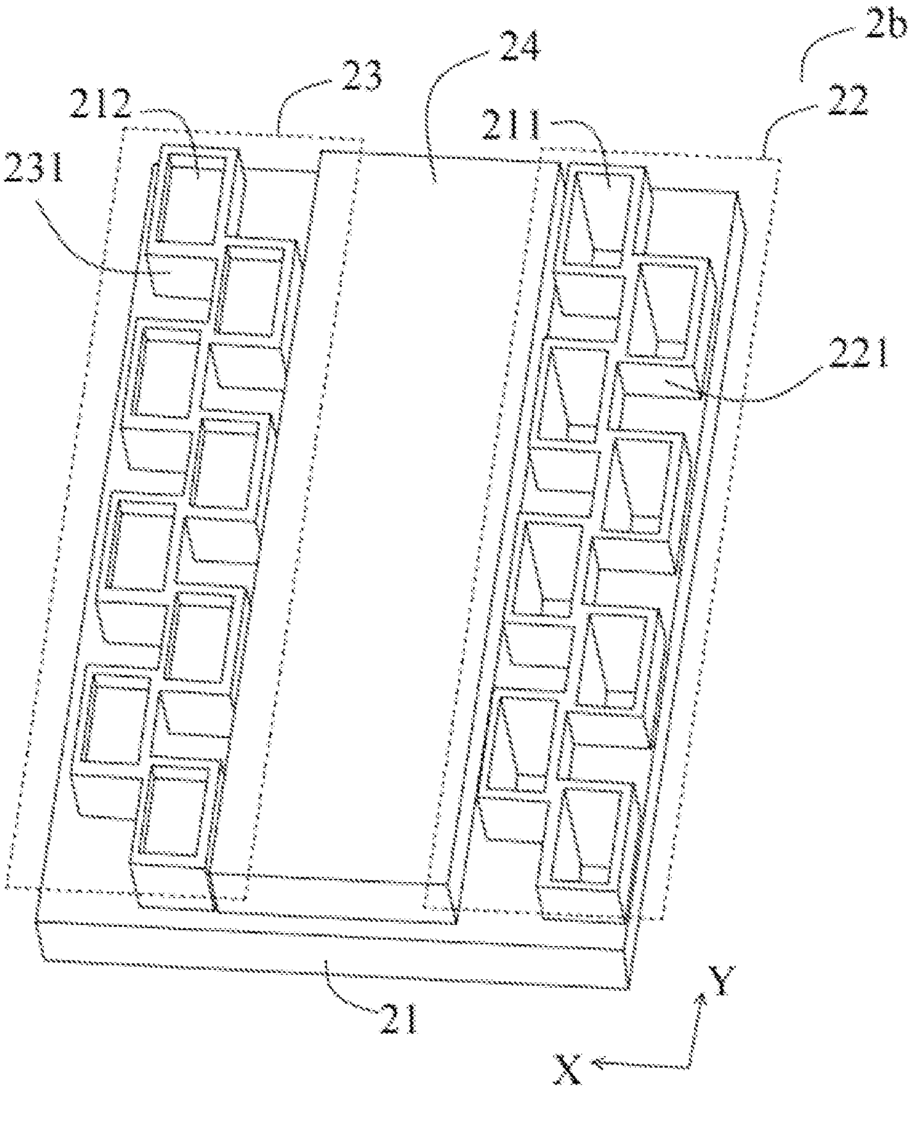
FIG. 13 is a structural diagram illustrating a third implementation of a waveguide unit corresponding to one column of a phase shifter array in a phased array antenna according to an embodiment of the present disclosure.

The embodiments of the present disclosure are not limited to adopting the first contact portion 22 and the second contact portion 23 in the unitary structures shown in FIG. 6 and FIG. 9, and in some implementations, each of the first contact portion 22 and the second contact portion 23 may also adopt a split structure, for example, FIG. 13 is a structural diagram illustrating a third implementation of a waveguide unit corresponding to one column of a phase shifter array in a phased array antenna according to an embodiment of the present disclosure. As shown in FIG. 13, the first contact portion 22 includes first contact sub-portions 221, the number of the first contact sub-portions 221 is the same as that of the waveguide cavities 211 corresponding to the same column of phase shifters, and the waveguide cavities 211 are formed in the first contact sub-portions 221 respectively, the second contact 23 includes second contact sub-portions 231, the number of the second contact sub-portions 231 is the same as the number of the reflective cavities 212 corresponding to the same column of phase shifters, and the reflective cavities 212 are formed in the second contact sub-portions 231 respectively. The structures of the first contact portion 22 and the second contact portion 23 are also matched with the structures of the first hollow-out portion 311 and the second hollow-out portion 312 shown in FIGS. 8, 10, 11 and 12, that is, the first hollow-out portion 311 and the second hollow-out portion 312 are both rectangular through holes, and respectively accommodate all the first contact sub-portions 221 and all the second contact sub-portions 231 therein.

Figure 14:
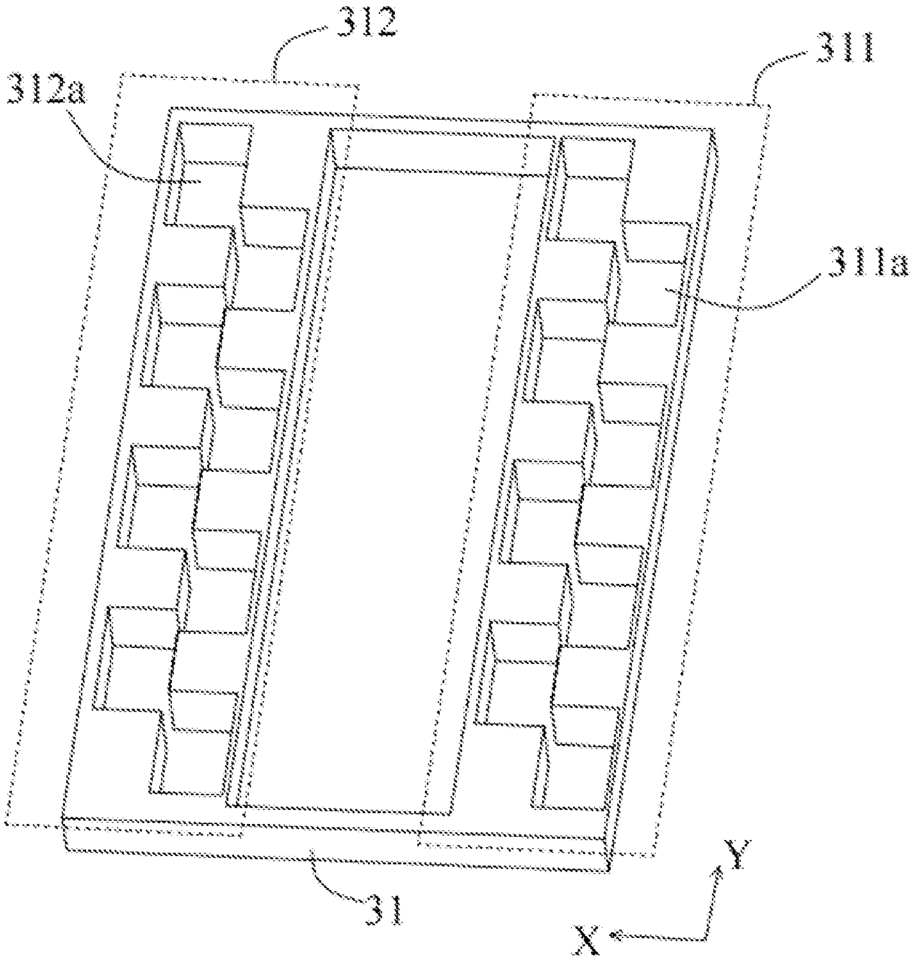
FIG. 14 is a structural diagram of an insulation sub-body of a phased array antenna according to an embodiment of the present disclosure.

However, the embodiments of the present disclosure are not limited thereto. FIG. 14 is a structural diagram of an insulation sub-body of a phased array antenna according to an embodiment of the present disclosure. In some implementations, in order to better realize the limiting function and reduce the difficulty of assembly, as shown in FIG. 14, the first hollow-out portion 311 includes first hollow-out sub-portions 311*a*, the number of the first hollow-out sub-portions 311*a* is the same as the number of the first contact sub-portions 221 in the first contact portion 22 corresponding to the the first hollow-out portion 311, and the first contact sub-portions 221 are correspondingly disposed in the first hollow-out sub-portions 311*a*, respectively; the second hollow-out portion 312 includes second hollow-out sub-portions 312*a*, the number of the second hollow-out sub-portions 312*a* is the same as the number of the second contact sub-portions 231 in the second contact portion 23 corresponding to the second hollow-out portion 312, and the second contact sub-portions 231 are correspondingly disposed in the second hollow-out sub-portion 312 a respectively.

In some implementations, taking the second waveguide unit 2*b* shown in FIG. 13 as an example, for all the waveguide cavities 211 corresponding to a same column of phase shifters, any two adjacent waveguide cavities 211 are staggered from each other in the first direction (i.e., the X direction), and all the waveguide cavities 211 are arranged in two sub-columns in the second direction (i.e., the Y direction); similarly, for all the reflective cavities 212 corresponding to a same column of phase shifters, any two adjacent reflective cavities 212 are staggered from each other in the first direction, and all the reflective cavities 212 are arranged in two sub-columns in the second direction. Correspondingly, for all the first contact sub-portions 221 corresponding to a same column of phase shifters, any two adjacent first contact sub-portions 221 are staggered from each other in the first direction (i.e., the X direction), and all the first contact sub-portions 221 are arranged in two sub-columns in the second direction (i.e., the Y direction); similarly, for all the second contact sub-portions 231 corresponding to a same column of phase shifters, any two adjacent second contact sub-portions 231 are staggered from each other in the first direction (i.e., the X direction), and all the second contact sub-portions 231 are arranged in two sub-columns in the second direction (i.e., the Y direction). Taking the insulation body 31 shown in FIG. 14 as an example, for all the first hollow-out sub-portions 311*a* corresponding to a same column of phase shifters, any two adjacent first hollow-out sub-portions 311*a* are staggered from each other in the first direction (i.e., the X direction), and all the first hollow-out sub-portions 311*a* are arranged in two sub-columns in the second direction (i.e., the Y direction); similarly, for all the second hollow-out sub-portions 312*a* corresponding to a same column of phase shifters, any two adjacent second hollow-out sub-portions 312*a* are staggered from each other in the first direction (i.e., the X direction), and all the second hollow-out sub-portions 312*a* are arranged in two sub-columns in the second direction (i.e., the Y direction).

Figure 15:
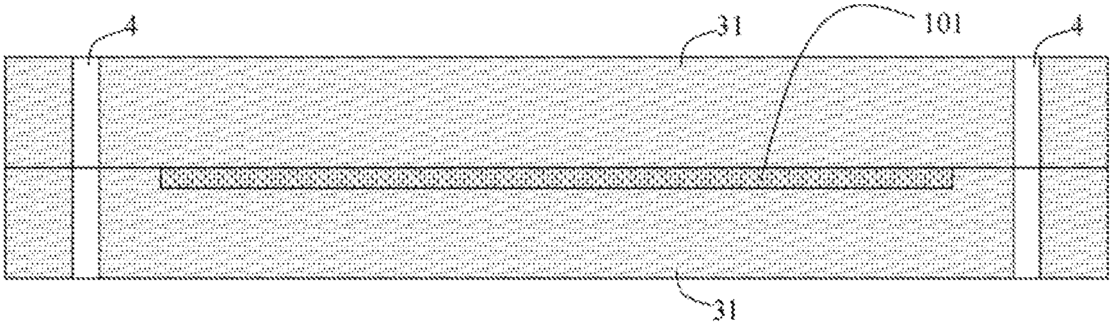
FIG. 15 is a side view illustrating an implementation of an overall structure of a phased array antenna according to an embodiment of the present disclosure.
Figure 16:
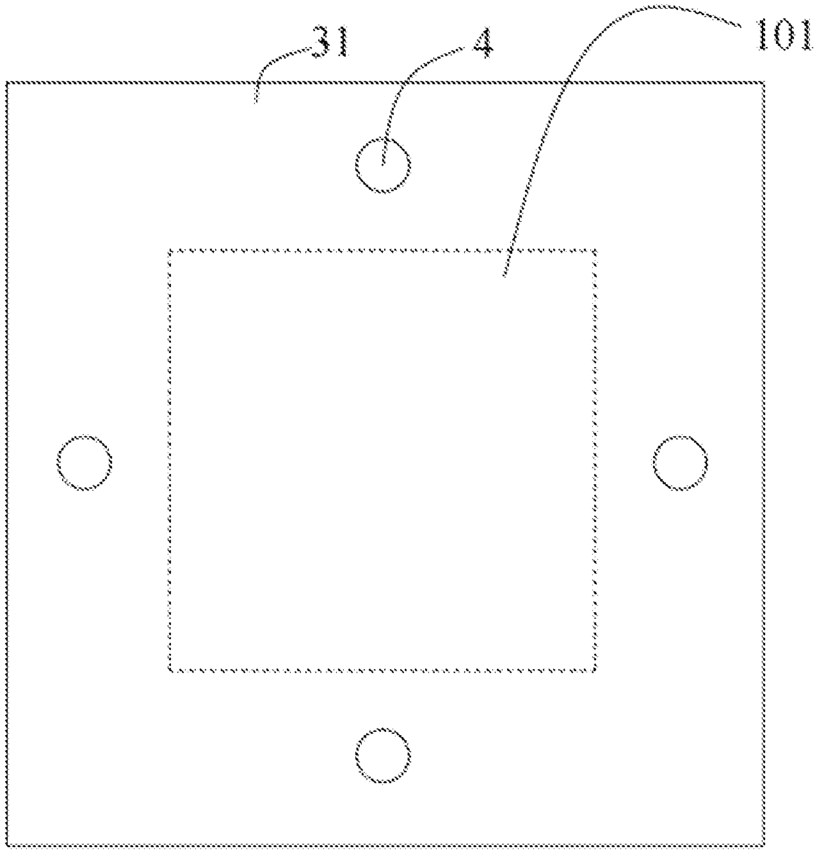
FIG. 16 is a top view illustrating an implementation of an overall structure of a phased array antenna according to an embodiment of the present disclosure.

FIG. 15 is a side view illustrating an implementation of an overall structure of a phased array antenna according to an embodiment of the present disclosure. FIG. 16 is a top view illustrating an implementation of an overall structure of a phased array antenna according to an embodiment of the present disclosure. As shown in FIGS. 15 and 16, in some implementations, there are two waveguide units respectively located on the sides where the two substrate surfaces are located. An outline size of an orthographic projection of each of the two insulation bodies 31 located at the sides where the two substrate surfaces are respectively located on a plane parallel to the substrate surfaces is greater than an outline size of an orthographic projection of each of the two substrate surfaces on the plane parallel to the substrate surfaces, the two insulation bodies 31 are mutually superposed, and an accommodating space for accommodating the phase shifter unit 101 is formed between the two insulation bodies 311. That is, each of the insulation bodies 311 adopts a unitary structure, and has an overall size greater than that of the phase shifter unit 101 (including at least one phase shifter 1) to completely clad the phase shifter unit 101. Therefore, the assembly process can be further simplified, and the difficulty of assembly is reduced. In some implementations, a plurality of fixing holes 4 are correspondingly provided in each of the two insulation bodies 311, and the plurality of fixing holes 4 are distributed at a periphery of the phase shifter unit 101 at intervals along a circumferential direction of the phase shifter unit 101. The phased array antenna further includes a plurality of fasteners (not shown in the drawings) which are the same in number as the fixing holes of each insulation body, and the fasteners are installed in the fixing holes 4 respectively. The insulation body 31 shown in FIGS. 15 and 16 is applicable to the waveguide unit employed in any of the foregoing implementations of the present disclosure.

In summary, the phased array antenna provided in the embodiments of the present disclosure adopts the connection unit and the waveguide unit in any one of the foregoing implementations, so that not only the alignment and assembly between the waveguide unit and the phase shifter unit can be achieved, but also damage to the bases of the phase shifter unit during assembly can be avoided.

It is to be understood that the above embodiments are merely exemplary embodiments that are employed to illustrate the principles of the present disclosure, but are not to be construed as limiting the present disclosure. It will be apparent to those skilled in the art that various modifications and improvements may be made without departing from the spirit and scope of the present disclosure, and such modifications and improvements are also considered to be within the scope of the present disclosure.

What is claimed is:

1. A phased array antenna, comprising: a phase shifter unit, at least one waveguide unit and at least one connection unit, wherein the phase shifter unit has two substrate surfaces facing away from each other and comprises at least one phase shifter, each phase shifter having two feeding regions;

a side where at least one of the substrate surfaces is located is provided with the waveguide unit, and the waveguide unit is provided with a waveguide cavity corresponding to at least one of the feeding regions of each phase shifter;

the connection unit is arranged corresponding to each waveguide unit and comprises an insulation body, and the insulation body is fixedly connected with the substrate surface and the waveguide unit on the same side as the insulation body; the insulation body is provided therein with a first hollow-out portion, the waveguide unit is in contact with the substrate surface through the first hollow-out portion, and a first port of the waveguide cavity is located on a contact surface, which is in contact with the substrate surface, of the waveguide unit in the first hollow-out portion.

2. The phased array antenna of claim 1, wherein the insulation body comprises a hard foam.

3. The phased array antenna of claim 2, wherein the hard foam comprises polyethylene foam, polystyrene foam, ethylene vinyl acetate copolymer or polyurethane foam.

4. The phased array antenna of claim 2, wherein the at least one waveguide unit comprises two waveguide units, which are located on sides where the two substrate surfaces are located, respectively, each waveguide unit has the waveguide cavity provided corresponding to the phase shifter;

each waveguide unit is further provided with a reflective cavity corresponding to each phase shifter, and each feeding region of each phase shifter corresponds to the waveguide cavity of one of the waveguide units and corresponds to the reflective cavity of the other of the waveguide units;

the insulation body is further provided with a second hollow-out portion therein, the waveguide unit is further in contact with the substrate surface through the second hollow-out portion, and a port of the reflective cavity is located on a contact surface, which is in contact with the substrate surface, of the waveguide unit in the second hollow-out portion.

5. The phased array antenna of claim 1, wherein the insulation body is respectively and fixedly attached to the waveguide unit and the substrate surface on the same side as the insulation body by means of bonding.

6. The phased array antenna of claim 1, wherein the at least one waveguide unit comprises two waveguide units, which are located on sides where the two substrate surfaces are located, respectively, each waveguide unit has the waveguide cavity provided corresponding to the phase shifter;

each waveguide unit is further provided with a reflective cavity corresponding to each phase shifter, and each feeding region of each phase shifter corresponds to the waveguide cavity of one of the waveguide units and corresponds to the reflective cavity of the other of the waveguide units;

the insulation body is further provided with a second hollow-out portion therein, the waveguide unit is further in contact with the substrate surface through the second hollow-out portion, and a port of the reflective cavity is located on a contact surface, which is in contact with the substrate surface, of the waveguide unit in the second hollow-out portion.

7. The phased array antenna of claim 6, wherein each of the waveguide units comprises a waveguide body, which is arranged on a surface of the insulation body away from the substrate surface at the same side as the waveguide body, and a surface of the waveguide body facing the insulation body is formed with a first contact portion and a second contact portion, and wherein, the first contact portion is inserted in the first hollow-out portion and is in contact with the substrate surface, and the waveguide cavity is formed in the first contact portion;

the second contact portion is inserted in the second hollow-out portion and is in contact with the substrate surface, and the reflective cavity is formed in the second contact portion.

8. The phased array antenna of claim 7, wherein the at least one phase shifter comprises a plurality of phase shifters, which are arranged in a rectangular array, rows and columns of the rectangular array are in a first direction and a second direction perpendicular to each other in a plane parallel to the substrate surface, respectively, and wherein the second direction is perpendicular to a direction in which the two feeding regions of each of the phase shifters are connected;

for each waveguide body, first contact portions are the same in number as the columns of the rectangular array, second contact portions are the same in number as the columns of the rectangular array, and all waveguide cavities corresponding to the phase shifters in a same column are correspondingly formed on a same one of the first contact portions, and all reflective cavities corresponding to the phase shifters in a same column are correspondingly formed on a same one of the second contact portions;

first hollow-out portions are the same in number as the first contact portions, and the first contact portions are arranged in the first hollow-out portions respectively; second hollow-out portions are the same in number as the second contact portions, and the second contact portions are arranged in the second hollow-out portions respectively.

9. The phased array antenna of claim 8, wherein a shape of each first hollowed-out portion is matched with a shape of the first contact portion corresponding to the first hollowed-out portion, and a shape of each second hollow-out portion is matched with a shape of the second contact portion corresponding to the second hollow-out portion.

10. The phased array antenna of claim 9, wherein both the first contact portion and the second contact portion are rectangular protrusions.

11. The phased array antenna of claim 8, wherein the first contact portion comprises first contact sub-portions, a number of the first contact sub-portions is the same as a number of the waveguide cavities corresponding to the phase shifters in a same column, and the waveguide cavities are formed in the first contact sub-portions respectively;

the second contact portion comprises second contact sub-portions, a number of the second contact sub-portions is the same as that of the reflective cavities corresponding to the phase shifters in a same column, and the reflection cavities are formed in the second contact sub-portions respectively.

12. The phased array antenna of claim 11, wherein the first hollowed-out portion comprise first hollowed-out sub-portions, a number of the first hollowed-out sub-portions is the same as that of the first contact sub-portions in the first contact portion corresponding to the first hollowed-out portion, and the first contact sub-portions are arranged in the first hollowed-out sub-portions respectively;

the second hollow-out portion comprises second sub-portions, a number of the second sub-portions is the same as that of the second contact sub-portions in the second contact portion corresponding to the second hollow-out portion, and the second contact sub-portions are arranged in the second hollow-out sub-portions respectively.

13. The phased array antenna of claim 8, wherein for all the waveguide cavities corresponding to the phase shifters in a same column, any two adjacent waveguide cavities are staggered from each other in the first direction, and all the waveguide cavities are arranged in two sub-columns in the second direction;

for all the reflective cavities corresponding to the the phase shifters in a same column, any two adjacent reflective cavities are staggered in the first direction, and all the reflective cavities are arranged in two sub-columns in the second direction.

14. The phased array antenna of claim 8, wherein each insulation body comprises insulation sub-bodies, a number of the insulation sub-bodies is the same as a number of the columns of the rectangular array, and each of the insulation sub-bodies is provided with one of the first hollowed-out portions and one of the second hollowed-out portions;

each waveguide body comprises waveguide sub-bodies, a number of the waveguide sub-bodies is the same as that of the insulation sub-bodies, the waveguide sub-bodies are respectively arranged on surfaces, away from the substrate surface, of the insulation sub-bodies on the same side as the waveguide sub-bodies, and each waveguide sub-body is provided with one of the first contact portions and one of the second contact portions.

15. The phased array antenna of claim 14, wherein each insulation sub-body is provided with a limiting recess, each waveguide sub-body is provided with a limiting protrusion, and the limiting recess is matched with the limiting protrusion;

the limiting recess is located between the first hollow-out portion and the second hollow-out portion; the limit protrusion is located between the first contact portion and the second contact portion.

16. The phased array antenna of claim 15, wherein the limiting recess penetrates through the insulation sub-body in a direction perpendicular to the substrate surface.

17. The phased array antenna of claim 14, wherein each of the insulation sub-bodies comprises two ring bodies, and ring holes defined by the two ring bodies serve as the first hollowed-out portion and the second hollowed-out portion, respectively.

18. The phased array antenna of claim 17, wherein the limiting protrusion is located between the two ring bodies.

19. The phased array antenna of claim 1, wherein an outline size of an orthographic projection of each of the two insulation bodies located at the sides where the two substrate surfaces are respectively located on a plane parallel to the substrate surfaces is greater than an outline size of an orthographic projection of each of the two substrate surfaces on the plane parallel to the substrate surfaces, the two insulation bodies are mutually superposed, and an accommodating space for accommodating the phase shifter unit is formed between the two insulation bodies.

20. The phased array antenna of claim 19, wherein a plurality of fixing holes are provided in each of the two insulation bodies, and the plurality of fixing holes are spaced at a periphery of the phase shifter unit in a circumferential direction of the phase shifter unit;

the phased array antenna further comprises a plurality of fasteners, a number of the fasteners is the same as that of the fixing holes of each of the insulation bodies, and the fasteners are correspondingly installed in the fixing holes.

* * * * *